US011388693B2

(12) United States Patent
Selvaganapathy et al.

(10) Patent No.: US 11,388,693 B2
(45) Date of Patent: Jul. 12, 2022

(54) INTERFACE ENHANCEMENTS FOR TIMING ADVANCE-BASED MULTILATERATION FOR USER DEVICE POSITIONING MEASUREMENTS

(71) Applicant: NOKIA SOLUTIONS AND NETWORKS OY, Espoo (FI)

(72) Inventors: Srinivasan Selvaganapathy, Bangalore (IN); Juergen Hofmann, Merching (DE); Sathiaseelan Sundaralingam, Camberley (IN); Muneender Chiranji, Hyderabad (IN); Hartmut Wilhelm, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/325,380

(22) PCT Filed: May 30, 2017

(86) PCT No.: PCT/EP2017/062960
§ 371 (c)(1),
(2) Date: Feb. 13, 2019

(87) PCT Pub. No.: WO2018/033260
PCT Pub. Date: Feb. 22, 2018

(65) Prior Publication Data
US 2019/0200320 A1 Jun. 27, 2019

(30) Foreign Application Priority Data
Aug. 17, 2016 (IN) .............................. 201641027976

(51) Int. Cl.
H04W 56/00 (2009.01)
H04W 64/00 (2009.01)
(Continued)

(52) U.S. Cl.
CPC ......... *H04W 64/003* (2013.01); *H04W 24/10* (2013.01); *H04W 56/001* (2013.01);
(Continued)

(58) Field of Classification Search
CPC . H04W 64/003; H04W 24/10; H04W 56/001; H04W 56/005; H04W 64/00; H04W 68/005; H04W 74/0833
(Continued)

(56) References Cited

U.S. PATENT DOCUMENTS

2007/0099639 A1\* 5/2007 Mege ................ H04W 56/0005
455/502
2009/0252125 A1 10/2009 Vujcic
(Continued)

FOREIGN PATENT DOCUMENTS

WO 2017040147 A1 3/2017

OTHER PUBLICATIONS

Office Action for European Application No. 17733358.0, dated Mar. 3, 2020, 5 pages.
(Continued)

*Primary Examiner* — Sai Ming Chan
(74) *Attorney, Agent, or Firm* — Brake Hughes Bellermann LLP

(57) ABSTRACT

A technique is provided for receiving, by a user device from a serving base station, a list of base stations including base station identities and/or respective information about their physical channels used for broadcast signaling for which a timing advance measurement is being requested, receiving, by the user device, a positioning reference identifier associated with a timing advance measurement procedure with respect to the user device and one or more base stations identified in the list, and sending, by the user device to one or more of the base stations identified in the list, an uplink
(Continued)

signal including a synchronization sequence and the positioning reference identifier.

19 Claims, 5 Drawing Sheets

(51) Int. Cl.
    *H04W 24/10*     (2009.01)
    *H04W 68/00*     (2009.01)
    *H04W 74/08*     (2009.01)

(52) U.S. Cl.
    CPC ......... *H04W 56/005* (2013.01); *H04W 64/00* (2013.01); *H04W 68/005* (2013.01); *H04W 74/0833* (2013.01)

(58) Field of Classification Search
    USPC .......................................................... 370/329
    See application file for complete search history.

(56) References Cited

U.S. PATENT DOCUMENTS

| | | | |
|---|---|---|---|
| 2010/0195566 A1* | 8/2010 | Krishnamurthy | H04L 5/0007 370/328 |
| 2010/0238872 A1* | 9/2010 | Kim | H04W 74/008 370/329 |
| 2012/0117135 A1* | 5/2012 | Yoon | H04J 13/102 708/209 |
| 2012/0302254 A1* | 11/2012 | Charbit | H04W 64/00 455/456.1 |
| 2014/0177607 A1 | 6/2014 | Li et al. | |
| 2014/0295883 A1* | 10/2014 | Kang | H04W 64/00 455/456.1 |
| 2015/0215982 A1* | 7/2015 | Siomina | H04W 76/14 370/252 |
| 2015/0230134 A1* | 8/2015 | Chiba | H04W 36/0016 370/331 |
| 2016/0105831 A1* | 4/2016 | Masini | H04W 36/24 455/436 |

OTHER PUBLICATIONS

International Search Report and Written Opinion for International Application No. PCT/EP2017/062960, dated Oct. 19, 2017, 10 pages.

Spirent; White Paper—"An Overview of LTE Positioning"; Sunnyvale, CA; Feb. 2012; 16 pages.

3GPP TSG RAN Meeting #72; RP-161060; Source: Huawei, HiSilicon; Agenda Item: 10.1.1; "New study item proposal: Evaluation of Rel-13 NB-IoT"; Busan, Korea; Jun. 13-16, 2016; 7 pages.

3GPP TSG RAN#72; RP-161034; Source: Ericsson; Agenda item 12.1; "Positioning Enhancements for GERAN-Introducing Timing Advance Trilateration"; Busan, Korea; Jun. 13-16, 2016; 8 pages.

3GPP TSG_RAN WG6 #1; R6-160085; Source: Nokia; Agenda item 6.1; "Radio Interface Enhancements for TA Based Multilateration (Update of RP-160034)"; Gothenburg, Sweden; Aug. 22-26, 2016; 10 pages.

First Examiner Report for Indian Application No. 201641027976, dated Nov. 16, 2021, 6 pages.

* cited by examiner

INTERFACE ENHANCEMENTS FOR TIMING ADVANCE-BASED MULTILATERATION FOR USER DEVICE POSITIONING MEASUREMENTS

CROSS-REFERENCE TO RELATED APPLICATIONS

This application is a national stage entry of International Application No. PCT/EP2017/062960, filed May 30, 2017, entitled "INTERFACE ENHANCEMENTS FOR TIMING ADVANCE-BASED MULTILATERATION FOR USER DEVICE POSITIONING MEASUREMENTS" which claims the benefit of priority of Indian Application No. 201641027976, filed Aug. 17, 2016, both of which are hereby incorporated by reference in their entireties.

TECHNICAL FIELD

This description relates to communications, and in particular, to interface enhancements for timing advance-based multilateration for user device positioning measurements.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. S-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments.

In some cases, it may be useful for the network to determine a position of a user device or user equipment (UE). For example, there may be some user devices that may not include a GPS receiver, or the user device may be indoors where a GPS receiver may be unable to receive a signal. In such cases, the network may track, or may need to track, the locations or positions of such devices.

SUMMARY

According to an example implementation, a method may include receiving, by a user device from a serving base station, a list of base stations including base station identities and/or respective information about their physical channels used for broadcast signaling for which a timing advance measurement is being requested, receiving, by the user device, a positioning reference identifier associated with a timing advance measurement procedure with respect to the user device and one or more base stations identified in the list, and sending, by the user device to one or more of the base stations identified in the list, an uplink signal including a synchronization sequence and the positioning reference identifier.

According to an example implementation, an apparatus includes at least one processor and at least one memory including computer instructions, when executed by the at least one processor, cause the apparatus to: receive, by a user device from a serving base station, a list of base stations including base station identities and/or respective information about their physical channels used for broadcast signaling for which a timing advance measurement is being requested, receive, by the user device, a positioning reference identifier associated with a timing advance measurement procedure with respect to the user device and one or more base stations identified in the list, and send, by the user device to one or more of the base stations identified in the list, an uplink signal including a synchronization sequence and the positioning reference identifier.

According to an example implementation, an apparatus includes means for receiving, by a user device from a serving base station, a list of base stations including base station identities and/or respective information about their physical channels used for broadcast signaling for which a timing advance measurement is being requested, means for receiving, by the user device, a positioning reference identifier associated with a timing advance measurement procedure with respect to the user device and one or more base stations identified in the list, and means for sending, by the user device to one or more of the base stations identified in the list, an uplink signal including a synchronization sequence and the positioning reference identifier.

According to an example implementation, a computer program product includes a computer-readable storage medium and storing executable code that, when executed by at least one data processing apparatus, is configured to cause the at least one data processing apparatus to perform a method including: receiving, by a user device from a serving base station, a list of base stations including base station identities and/or respective information about their physical channels used for broadcast signaling for which a timing advance measurement is being requested, receiving, by the user device, a positioning reference identifier associated with a timing advance measurement procedure with respect to the user device and one or more base stations identified in the list, and sending, by the user device to one or more of the base stations identified in the list, an uplink signal including a synchronization sequence and the positioning reference identifier.

According to an example implementation, a method may include transmitting, by a serving base station to a user device, a cell reselection command including a list of base stations for which a timing advance measurement is being requested for the user device, and a positioning reference identifier associated with the timing advance measurement for the user device, wherein the positioning reference identifier is small enough to be transmitted by the user device within an uplink signal or access burst without requiring establishing a temporary block flow to transmit the positioning reference identifier.

According to an example implementation, an apparatus includes at least one processor and at least one memory including computer instructions, when executed by the at least one processor, cause the apparatus to: transmit, by a serving base station to a user device, a cell reselection command including a list of base stations for which a timing advance measurement is being requested for the user device, and a positioning reference identifier associated with the timing advance measurement for the user device, wherein the positioning reference identifier is small enough to be transmitted by the user device within an uplink signal or access burst without requiring establishing a temporary block flow to transmit the positioning reference identifier.

According to an example implementation, an apparatus includes means for transmitting, by a serving base station to a user device, a cell reselection command including a list of base stations for which a timing advance measurement is being requested for the user device, and a positioning reference identifier associated with the timing advance measurement for the user device, wherein the positioning reference identifier is small enough to be transmitted by the user device within an uplink signal or access burst without requiring establishing a temporary block flow to transmit the positioning reference identifier.

According to an example implementation, a computer program product includes a computer-readable storage medium and storing executable code that, when executed by at least one data processing apparatus, is configured to cause the at least one data processing apparatus to perform a method including: transmitting, by a serving base station to a user device, a cell reselection command including a list of base stations for which a timing advance measurement is being requested for the user device, and a positioning reference identifier associated with the timing advance measurement for the user device, wherein the positioning reference identifier is small enough to be transmitted by the user device within an uplink signal or access burst without requiring establishing a temporary block flow to transmit the positioning reference identifier.

According to an example implementation, a method may include receiving, by a base station from a user device, an uplink signal including a synchronization sequence and a positioning reference identifier associated with a timing advance measurement procedure with respect to the user device, measuring, by the base station, a timing advance with respect to the user device, and reporting, by the base station, the measured timing advance to a network entity.

According to an example implementation, an apparatus includes means for receiving, by a base station from a user device, an uplink signal including a synchronization sequence and a positioning reference identifier associated with a timing advance measurement procedure with respect to the user device, means for measuring, by the base station, a timing advance with respect to the user device, and means for reporting, by the base station, the measured timing advance to a network entity.

According to an example implementation, an apparatus includes at least one processor and at least one memory including computer instructions, when executed by the at least one processor, cause the apparatus to: receive, by a base station from a user device, an uplink signal including a synchronization sequence and a positioning reference identifier associated with a timing advance measurement procedure with respect to the user device, measure, by the base station, a timing advance with respect to the user device, and report, by the base station, the measured timing advance to a network entity.

According to an example implementation, a computer program product includes a computer-readable storage medium and storing executable code that, when executed by at least one data processing apparatus, is configured to cause the at least one data processing apparatus to perform a method including: receiving, by a base station from a user device, an uplink signal including a synchronization sequence and a positioning reference identifier associated with a timing advance measurement procedure with respect to the user device, measuring, by the base station, a timing advance with respect to the user device, and reporting, by the base station, the measured timing advance to a network entity.

The details of one or more examples of implementations are set forth in the accompanying drawings and the description below. Other features will be apparent from the description and drawings, and from the claims.

DETAILED DESCRIPTION

Figure 1:
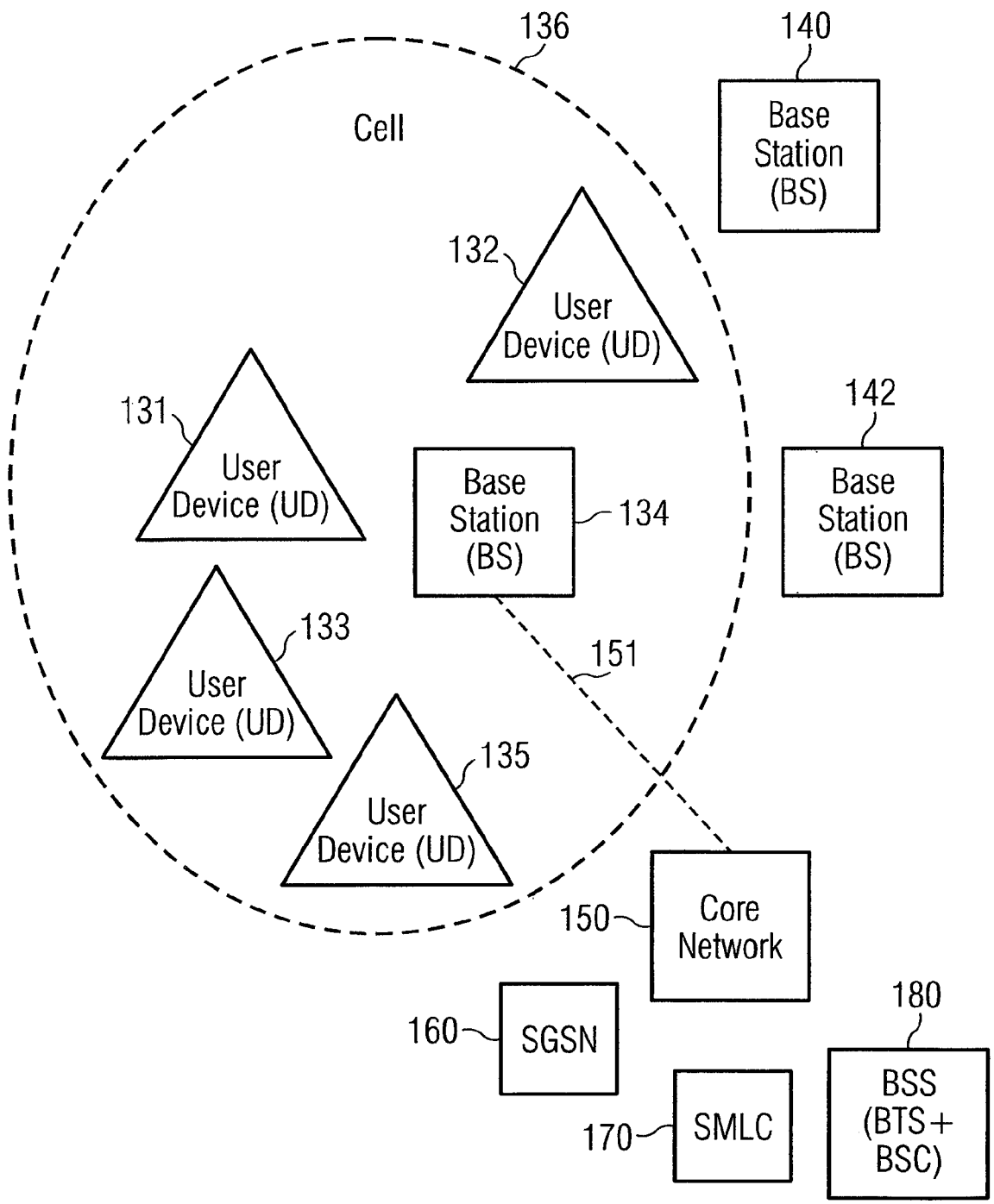
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as a base transceiver stations (BTS), an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. According to an example implementation, BS 134 may currently be a serving BS (or serving cell) for user device 132, while BSs 140 and 142 are neighbor BSs that are not currently serving the user device 132, for example. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

By way of illustrative example, the various example implementations or techniques described herein may be applied to various user devices, such as machine type communication (MTC) user devices, enhanced machine type communication (eMTC) user devices, Internet of Things (IoT) user devices, and/or narrowband IoT user devices. IoT may refer to an ever-growing group of objects that may have Internet or network connectivity, so that these objects may send information to and receive information from other network entities. For example, many sensor type applications or devices may monitor a physical condition or a status, and may send a report to a server or other network entities, e.g., when an event occurs.

Machine Type Communications (MTC, or Machine to Machine communications) may, for example, be characterized by fully automatic data generation, exchange, processing and actuation among intelligent machines, with or without intervention of humans. For example, eMTC may be an example of a narrowband user device. By limiting the operation of an eMTC user device to a narrowband operation, this may allow cheaper or less expensive eMTC user devices to be used for specific MTC applications or uses. In some cases, a MTC or eMTC device may not necessarily include a GPS receiver, e.g., in order to decrease the cost of such device.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The network (which may include BSs and/or the core network 150) may also include one or more of the following, for example: 1) a base station subsystem (BSS) 180, which may include one or more base transceiver stations/base stations (BTS or BS) and a base station controller (BSC) (there may be a BSC for a group of BSs, and/or the BSC may be co-located with a BS); Thus, one BSC may serve or control one or more BSs/BTSs; 2) a serving mobile location center (SMLC) 170, which may determine a location for one or more user devices/UEs, e.g., based on timing advance (TA) information and/or other information; and 3) a serving GPRS support node (SGSN) 160. Other blocks or functions may be included within the network as well. A TA may be measured by a BS, and may have a higher resolution than one symbol period of, e.g., 3.69 microseconds, as an example. Thus, the TA measurement resolution for the purpose of determining the position of a user device may be different or may be finer than the TA measurement resolution needed for commanding a TA to a user device, and the different or a finer resolution may also be used when the measured TA is reported to a network entity.

The various example implementations may be applied to a wide variety of wireless technologies or wireless networks, such as GSM, UTRA, LTE, LTE-A, 5G, cmWave, and/or mmWave band networks, IoT, MTC, eMTC, etc., or any other wireless network or wireless technology. These example networks or technologies are provided only as illustrative examples, and the various example implementations may be applied to any wireless technology/wireless network. Also, as noted, the various example implementations may be applied to a variety of user devices, such as, for example, user devices, UEs, mobile stations, eMTC user devices, and/or IoT or narrowband IoT user devices.

Machine type communication (MTC) is expected to be an important and/or widely used or adopted traffic type in cellular networks. To satisfy this demand, cellular networks may provide improved services for Machine Type Communications. In 3GPP, three new technologies, namely eMTC and NB-IoT based on the LTE Air interface as well as EC (extended coverage)-GSM-IoT based on the GSM Air interface are introduced for Cellular IoT support. Some objectives of these new technologies may include, for example, extended coverage, e.g., up to 20 dB, improved battery life time up to 10 years, for example, and massive device capacity per cell. EC-GSM-IoT, eMTC and NB-IoT are mentioned here by way of illustrative example.

One enhancement identified for all three technologies is improved positioning performance for IoT devices (and/or for other devices). Tracking of MTC or IoT devices, for example, may be, at least in some cases, an important aspect in some of the use cases of machine type communications such as vehicle tracking, parcel or package tracking, identifying the location of faulty device/alarm device etc. For example, an MTC or IoT device may be attached to an object (e.g., vehicle, package or other object) for tracking a location or status of the object. As the IoT devices are expected to be of lower cost, the devices may not have built-in GPS receiver. Also, it may be useful or advantageous to provide high positioning performance for indoor devices, which cannot typically be operated using satellite based positioning such as GPS (Global Positioning System) or GALILEO.

To provide a sufficiently accurate position estimate in these environments, for example, and other environments, it may be advantageous for a cellular network to provide a mechanism that supports determining a location (such as timing advance multilateration technique) of a user device/UE while reducing (e.g., minimizing) energy consumption of the device for the location procedure in order to preserve battery life for the device. Multilateration (e.g., bilateration or trilateration) may include determining a position of a user device/UE based on multiple timing advance (or propagation delay times) measurements for the user device or UE, e.g., a TA provided with respect to each of multiple locations or BSs. An arc may be calculated for each TA or propagation delay, determined for the wireless connection between a BS and a user device, and an intersection(s) of such multiple arcs may provide an estimate of a position of the user device or UE. Trilateration may include, for example, estimating a position of a user device based on a TA from three different physical locations, such as a TA for a user device provided by a serving BS, and a TA provided by each of two other (e.g., neighbor) BSs.

A timing advance (TA) for a UE or user device may be determined by a BS based on a received uplink synchronization sequence (such as an access burst or a random access request, which may be transmitted over a random access channel or other resource). The TA indicates an offset to be used by the UE or user device for uplink transmission. The TA may be approximately equal to 2*(propagation delay between user device/UE and BS), for example. Thus, a TA may be used to determine or estimate a distance between the user device and the measuring BS (thus, the TA defining an arc associated with such distance, e.g., where a center of the arc may be the BS antenna, or a length of the arc may depend on the receive antenna pattern or sector used by the measuring BS). The TA may be provided to the user device as a negative offset, between the start of a received downlink subframe and a transmitted uplink subframe, and may include a fixed time offset between downlink and uplink subframes as defined by the network.

TA measurement by a BS with respect to a user device may, for example, require that the user device sends an access burst via a random access channel to the BS, and then the user device setting up a temporary block flow (TBF) to receive an uplink allocation, and then the user device sending an identifier (such as a temporary logical link identifier or TLLI, which may be 30 bits or more, for example) to the BS. The TBF (or multiple TBFs) may then be released. A TLLI (temporary logical link identifier) may be used to provide a signaling address for communication between a user device and the network. However, the TLLI, e.g., at 32 bits long, is too long to fit within the access burst, and thus, a TBF must typically be created to subsequently transmit the TLLI. A TBF (temporary block flow) may be a connection established between a user device and a BS to enable packet exchanges between the user device and the BS. Unfortunately, some user devices (e.g., MTC or eMTC devices, IoT devices) may have a very limited battery lifetime. And, in some cases, the multiple transmissions including transmitting an access burst and a follow-up transmission of a TLLI, and/or the user device establishing and releasing of the TBF may consume significant energy or battery resources at the user device, further considering that the user device may be in extended coverage related to the TA measuring BS and hence requiring one or more retransmissions of the TLLI by the user device and thereby increasing the energy consumption at the user device.

Various example implementations described herein may provide one or more techniques, which may include a radio interface procedure for a timing advance (TA) multilateration positioning mechanism. Therefore, various example implementations are described in which TA measurement may be facilitated with lower energy consumption by the user device, e.g., by the user device sending an UL signal to a BS to cause the BS to measure a TA for the user device, e.g., within a process for the user device that consumes less energy, and thereby potentially increasing battery life. According to an example implementation, rather than transmitting an access burst followed by a transmission of a TLLI via TBF, a shorter process may be used that consumes less energy by the user device, and, for example, that may be performed without establishing a TBF (at least in some cases) for purposes of causing a BS to measure and report a TA (for positioning determination).

According to an example implementation, a user device may transmit a short (e.g., 10-11 bit) positioning reference temporary identifier (PRTI) within an uplink signal to a BS (e.g., to each of a plurality of neighbor BSs or other suitable BS, which signal may be received and successfully decoded by the user device) that includes a synchronization sequence, to cause the BS to perform a TA measurement with respect to the user device and then report the TA measurement to the network. A neighbor BS may include, for example, any BS that is adjacent to the user device, as well as non-adjacent BSs that the user device can communicate with. Thus, at least in some cases, a neighbor BS may be any non-serving BS that the user device is capable of communicating with, for example. The PRTI may, for example, be associated with a TA measurement procedure for the user device for multiple BSs. According to an illustrative example implementation, the user device may transmit the PRTI via an access burst, which may typically be used for random access (e.g., for the user device to obtain a TA and uplink resource allocation). However, according to an example implementation, one or more fields within the access burst may be replaced by a short PRTI. The PRTI may identify or may be associated with a timing advance (TA) measurement procedure (e.g., TAs measured by one or more BSs, and then forwarded to the network) for the user device, e.g., for purposes of positioning (network estimating a position of the user device based on the TAs). For example, because the PRTI is short (e.g., shorter than the TLLI), such as 11 bits, the PRTI may be directly transmitted within the uplink signal (e.g., within the access burst), thereby, at least in some cases, avoiding the subsequent transmission of the PRTI or TLLI in a subsequent message which may typically require creation of a TBF. Thus, by directly transmitting the PRTI within the uplink signal, fewer transmissions may typically be required by the user device to cause the BS to measure or determine a TA and report the TA to the network, and a TBF is not necessarily required to transmit the PRTI to the BS to cause measurement and reporting of the TA. In this manner, the user device may facilitate or allow the network to determine or estimate a position of the user device by causing each of multiple BSs to send a TA to the network, e.g., while using a shorter procedure (e.g., by directly transmitting the PRTI within the access burst and possibly avoiding the transmission of the PRTI or other identifier through a subsequent transmission via TBF) that may consume less energy for the user device, for example. For example, when receiving the UL (uplink) signal with the synchronization signal and the PRTI, the BS detects the PRTI. During the time interval when the BS receives the UL signal, the PRTI unambiguously identifies the user device. When the BS reports the measured TA to the network, it combines the TA with an identification of the corresponding user device. When performing the TA measurement procedure with multiple BSs, the user device may use the same PRTI for several BSs, but it may also be commanded to use different PRTIs for different BSs.

According to an example implementation, a user device may receive a PRTI (e.g., assigned by the network to the user device for TA measurement procedure) and a list of BSs (e.g., neighbor BSs) for TA measurement. The list of BSs for TA measurement may be sent within a cell reselection list or a TA measurement list. The PRTI may be sent along with the list, or may be sent via a paging request sent to the user device.

For each of the (one or more) BSs or cells identified in the list, the user device may typically send the PRTI to the BS (e.g., to cause the BS to measure and report the TA to the network, such as for positioning determination) in an uplink signal that may include a synchronization sequence and the PRTI. For example, the PRTI may be included in an access burst that may typically be used for random access (e.g., to allow the user device to obtain a TA for uplink timing). However, one or more fields in the access burst may be replaced with the PRTI.

In an example implementation, the PRTI may include a flag or bit that indicates whether or not the access burst includes a PRTI or not. For example, 11 bits may be transmitted in an example access burst, including a 10-bit PRTI and a 1-bit flag to indicate presence or absence of the PRTI. In this manner, an uplink signal (including a synchronization sequence and a PRTI) may be transmitted by the user device to one or more BSs to cause each of the BSs to measure a TA for the user device and report the TA to the network, e.g., without necessarily creating a TBF. The uplink signal (e.g., including a synchronization sequence and a PRTI) may be transmitted by the user device to a BS via common control channel such as a random access channel, or via dedicated uplink resources.

Although the serving BS may not necessarily be listed in the list of BSs (e.g., cell reselection list or TA measurement list) provided to the user device, the user device may also send (or have previously sent) an uplink signal (access burst) to the serving BS so that the serving BS will also determine a TA for the user device, and then report the TA to the network (e.g., which may be used by the network for positioning determination of the user device). For example, the user device may have sent an uplink signal (e.g., an access burst, which does not necessarily include the PRTI, since the PRTI may not have been assigned yet to the user device) to the serving cell/serving BS as part of random access performed with the currently serving cell/serving BS. TAs received by the network from the serving cell/serving BS and one or more other (e.g., neighbor) BSs may be used by the network to estimate a position of the user device. However, the PRTI may be sent by the user device via the uplink signal (e.g., access burst) to each neighbor BS indicated in the list (e.g., cell reselection list or TA measurement list) of cells/BSs for TA measurement, to cause such neighbor cells/BS s to measure and report a TA to the network, while providing a shorter process for the user device that consumes less energy, as noted.

In response to receiving the uplink signal including the synchronization sequence and the PRTI (e.g., which may include a flag indicating presence of the PRTI), each BS may measure the TA for the user device and then report the TA to the network. These TA measurements from multiple BSs (e.g., a TA from the serving BS and a TA from two other BSs) may be used by the network to estimate a position of the user device based on multilateration.

In addition, in response to receiving the uplink signal with the synchronization sequence and the PRTI, a (e.g., neighbor) BS may send an acknowledgement to the user device to acknowledge receipt of the uplink signal including the PRTI. Thus, the BS may send an acknowledgement by transmitting the PRTI to the user device. Each TA measurement procedure (which may include a TA measured and reported by each of the BSs on a list of BSs/cells) may be identified by a different PRTI. Thus, for example, a 10-bit PRTI may be used to identify $2^{10}$ different and concurrent measurement procedures. According to an example implementation, if the uplink signal (including PRTI) was transmitted via a common control channel (such as a random access channel), then the acknowledgement may be sent by BS via a common control channel, such as via an access grant channel (AGCH). If, for example, the uplink signal (including the PRTI) was transmitted by the user device via a dedicated resource, then the acknowledgement may be sent via another dedicated resource. For example, when the uplink signal is sent via dedicated resources, the BS knows the arrival of access burst/uplink signal and contents of the same, and this can be used for better channel estimation. For this purpose, for example, the BSC may send the PRTI value to the BSs when it reserves the dedicated resource(s) in the BS(s).

As noted, there are limits of course to the number of bits that can be included in the PRTI and transmitted within the uplink signal. One example access burst (or uplink signal) may accommodate only 11 bits, which may include a 1-bit flag and 10-bits for the PRTI. Thus, in the case, for example, where a longer PRTI may be required, e.g., to accommodate or identify more concurrent TA measurement procedures than can be uniquely (and temporarily) identified with the bits available in the uplink signal (e.g., access burst), then the PRTI may, for example, be split into multiple parts, and each part may be transmitted via one of multiple uplink signals (sent via one of multiple access bursts). For example, if an uplink signal can transmit 11 bits, including a 10 bit PRTI and a flag, but more than 10 bits are required for a PRTI, then a first part (e.g., most significant 10 bits) of a 20 bit PRTI may be sent via a first uplink signal in a first time slot (TS), e.g., TS0, and a second part (e.g., least significant 10 bits) of the PRTI may be transmitted via a second uplink signal in a second (and adjacent) time slot, e.g., TS1. In this manner, a longer PRTI may be transmitted and used to support a larger number of concurrent TA measurement procedures, while avoiding creating and releasing a TBF.

According to an example implementation, because the PRTI is short enough to fit within the uplink signal or access burst (e.g., only 10 bits or other length), PRTI values may be temporarily assigned to a user device or to a TA measurement procedure. Thus, for example, a PRTI value may be re-assigned after the TA measurement procedure is completed. For example, after all cells/BSs in the cell reselection list have measured and sent their TA to the network (e.g., in response to receiving an uplink signal including the PRTI from the user device), the network may then reuse or re-assign that PRTI to a new/different TA measurement procedure or a different user device.

Figure 2:
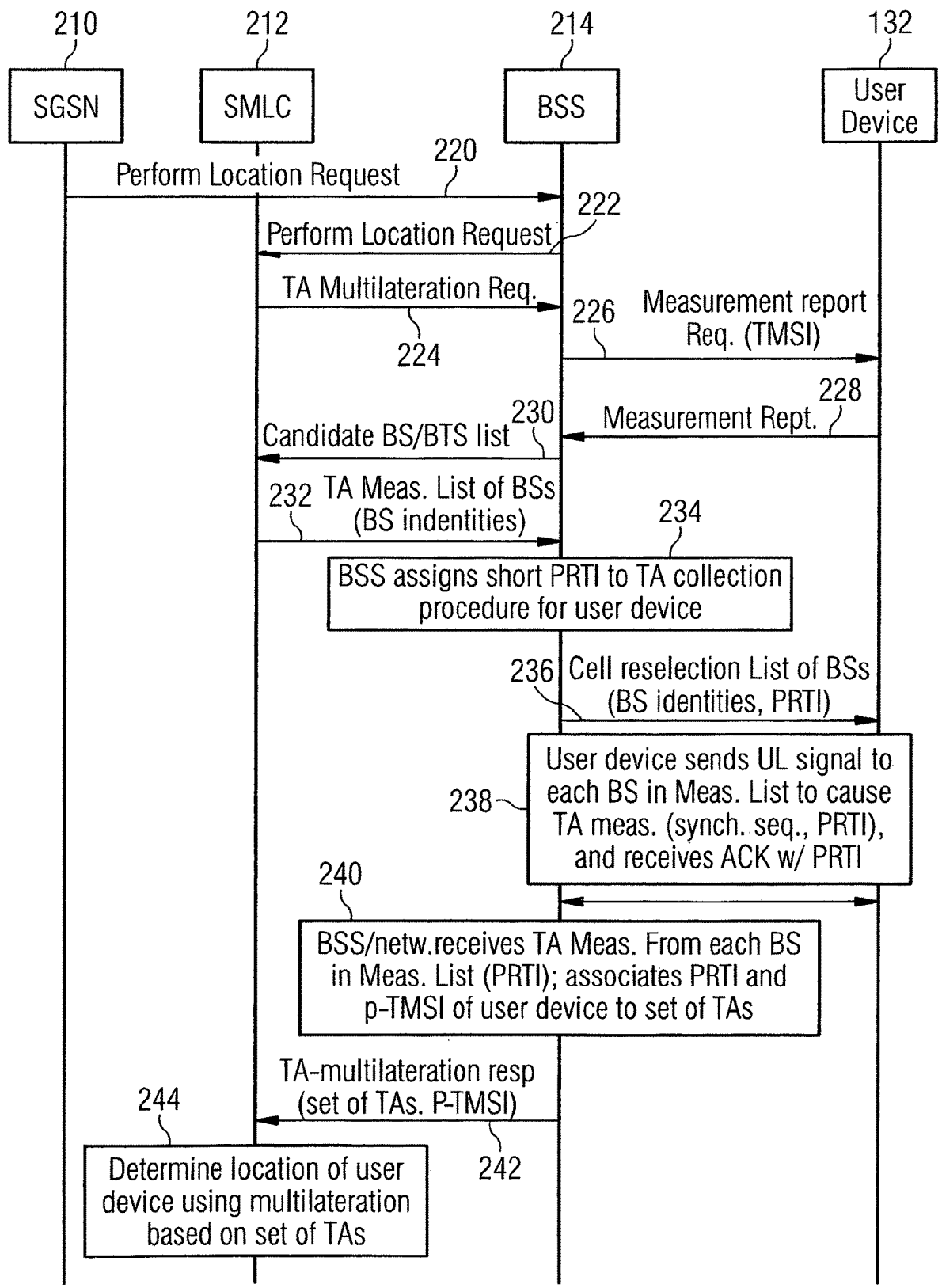
FIG. 2 is a diagram illustrating an operation of a system according to an example implementation.

FIG. 2 is a diagram illustrating an operation of a system according to an example implementation. A SGSN 210, a SMLC 212, a BSS 214 (which may include one or more BSs, and a BSC), and a user device 132 are shown in FIG. 2. Although not shown in FIG. 2, an application, which may be tracking a package, parcel, or vehicle, may send a request to the SGSN 210 for the location of the UE/user device that is connected to the parcel, package or vehicle to be tracked. At 220, the SGSN 210 sends a perform location request message to the BSS 214. At 222, the BSS sends a perform location request to the SMLC 212 to start the positioning procedure for the user device. At 224, the SMLC 212 sends a positioning (e.g. TA Multilateration) request for the user device (which may include a TMSI/P-TMSI or Temporary Mobile Subscriber Identification, or other identifier associated with the user device to be located).

At 226, the BSS 214 sends a measurement report request (e.g., including the TMSI of the user device) to user device 132 to trigger or cause the user device 132 to send a neighbor (cell) measurement report to the serving BS. For example, the measurement report request at 226 may be sent via common control channel. The user device 132 may then synchronize with each BS or cell and then measure a received signal strength (e.g., SINR (signal to interference plus noise ratio), RSSI (received signal strength indication), or RSRP (reference signal received power) or other signal quality or signal strength/power measurement) for signals received from each of a plurality of BSs.

The user device 132 may also measure an observed time difference (OTD) of each BS or cell or each of a subset of the received base stations/cells with respect to the serving BS or serving cell, which may be a difference in time (or difference in propagation delay between a neighbor BS and a serving BS) between receiving of same or corresponding signals from the neighbor BS as compared to receiving the same signal from the serving BS. Thus, for example, the user device may measure the OTD for a neighbor BS as a time difference between: 1) arrival (as measured by the user device) of a frame (e.g., start of receiving synchronization signals) from the neighbor BS and 2) arrival of a frame from the serving cell.

At 228, the user device may then send a measurement report to the BSS 214 to indicate a base station or cell identity (e.g., BS identifier or base station identification code) and a signal strength and/or signal quality measured for each BS. In an example implementation, the measured OTDs for each BS (or each of a subset of BSs) may also be included or reported in or with the neighbor (cell) measurement report provided at 228. The OTDs may, for example, be used by the network to assist in determining positions of one or more user devices (e.g., the current user device, and possibly other user devices that share two or more common BSs as neighbor BSs or a serving BS).

At 230, the BSS 214 sends a candidate BS/cell list to the SMLC for determination (by the SMLC) of the best BSs for multilateration. SMLC 212 may then determine a list of the best BSs (e.g., BSs/cells having highest received signal strength and that are not co-located, e.g., not belonging to the same cell site or having BTS/BS antennas located at different locations) for performing multilateration for the user device 132. At 232, the SMLC 212 sends the list of BSs/cells selected for TA measurement for multilateration (including BS or cell identity for each selected BS or cell). This list, for example, may include only neighbor (or non-serving) BSs/cells for the user device, and may not explicitly identify the serving BS/cell (even though the serving cell will typically also report a TA for the user device to the network).

At 234, the BSS 214 assigns a PRTI to the user device for a TA measurement procedure. At 236, the BSS (via a serving BS) sends a list, e.g., cell reselection list or TA measurement list which may include, for example, BS identities or cell identities and/or respective information about physical channels used by these BSs for broadcast signaling for which TA measurement is being requested, and the PRTI to be used for the TA measurement procedure for the user device.

At 234, the BSS 214 may, alternatively, assign different PRTIs for TA measurements with different BSs and, at 236, include these different PRTIs in the list. For example, this option or implementation (assigning different PRTIs to different BSs) may be useful if, for example, each of the 10 bit PRTIs is used at least in one of the cells for the TA measurement, but in each of the cells for TA measurement, at least one PRTI is currently free (no overlap of free PRTIs), e.g., where different PRTIs may be needed in different cells to find a unique PRTI inside each cell.

At 238, the user device 132 sends, to each BS in the list (cell reselection list or TA measurement list) of BSs received at 236, an uplink signal (e.g., access burst) including a synchronization sequence and the PRTI assigned to the TA measurement procedure for the user device (or assigned to the TA measurement procedure for the user device and the respective BS if different PRTIs were assigned for different BSs in the list). The user device 132 may, for example, receive an acknowledgement from each BS acknowledging that the BS received the uplink signal with PRTI. For example, the acknowledgement may be sent by a BS as the PRTI transmitted back to the user device 132.

At 240, each BS, in response to receiving the uplink signal (e.g., access burst) with the PRTI from user device 132, measures the timing advance (TA) for the user device and reports the TA to the BSC, and the BSC may forward the TA measurements to the SMLC 212, for example. Thus, in this manner, at 240, the BSS/network may receive TAs from each BS in the list of BSs (e.g., cell reselection list or TA measurement list provided to the user device). At 242, the BSS 214 sends a TA-multilateration response, including a set of TAs (e.g., TAs from BSs on the list), a TA received from the serving BS (if not sent already earlier, e.g., at 230), and the mobile subscriber identity (e.g., TMSI or Temporary Mobile Subscriber Identity, or the IMSI or the International Mobile Subscriber Identity). Note that the BSS 214 may identify the TMSI/IMSI for the user device based on the PRTI for each TA reported by a BS. The BSS 214 may report the TA measurements for this TA measurement procedure with the TMSI/IMSI. As noted above, the measurement report at 228 may also include one or more of the OTDs measured and then reported by the user device 132 in the measurement report at 228 to the serving BS (or BSS 214) at 228, and then these OTDs may be forwarded to SMLC 212 via candidate BS list at 230.

At 244, the SMLC 212 may determine or estimate a location or position of the user device 132 (and possibly a location of other user devices) based on the received TAs and/or the OTDs. The position of the user device 132 may then be reported back to the requesting application, e.g., via the BSS 214 and SGSN 210.

According to another example implementation, the uplink signals (e.g., access bursts including synchronization sequence and PRTI) may be transmitted by the user device to the BSs that are identified in the list received at 232 via dedicated resources (instead of transmitting the uplink signals via a common control channel, such as a random access channel). Therefore, according to an example implementation, at 234, the BSS 214 (or other network entity) may allocate a dedicated resource, such as an EC-PACCH/T (e.g., extended coverage packet associated control channel) dedicated block for each of the cells/BSs indicated on the list received at 232. At 236, or via a separate message, the BSS 214 may signal an indication of the dedicated resources to be used for each of the cells/BSs in the list, such as by indicating a start frame number (start-FN) or a reduced start frame number (e.g., which refers to a modulo operation carried out by the user device before accessing the dedicated resource) for each of the BSs on the list (cell reselection list or TA measurement list). Also, a timeslot number (TN) of the dedicated channel or resource may also be provided by the BSS to the user device for that cell. Then, at 238, the user device 132 may send an uplink signal (e.g., access burst), including the synchronization sequence and PRTI, to each of the BSs indicated on the list via the indicated dedicated resource (e.g., via a dedicated resource beginning at the start-FN for each target/neighbor BS). In addition, if the uplink signal (e.g., access burst) with PRTI was transmitted by the user device 132 to a BS via a dedicated resource (as opposed to a common control channel such as a random access channel), then the acknowledgement sent by the neighbor BS to the user device 132 that includes the PRTI may then be sent via a dedicated resource. For example, an acknowledgement (transmitting the PRTI back to the user device) may be sent in a dedicated resource that has a defined frame number offset (e.g., since, for example, a same timeslot number may be used in uplink transmission and downlink transmission/ACK).

Therefore two example methods or techniques will be described, with reference to FIG. 2.

Method-1: TA Collection Using EC-RACH without TBF Establishment

As per this method, when BSS requests the user device to send RACH attempts (e.g., uplink signals or access bursts) on EC-RACH to specific selected neighbour cells, BSS provides a Positioning-Reference-Temporary-Identifier (PRTI) which may be associated with the P-TMSI/TLLI, which the user device can send within the RACH message (uplink signal or access burst) itself so that TBF establishment for sending TLLI to these neighbour cells/BSs is avoided. Here the Positioning-Request-Temporary-Identifier is shorter in length (e.g., 10 bits) compared to TLLI (32 bits).

The Timing Advance collection procedure may include the following, by way of example.

BSS sends Page message to user device (or UE or MS).

User device sends EC-RACH followed by TBF establishment to send Page-response and TLLI. (note that Method 3 (and FIG. 3) described below may provide further energy savings for user device where PRTI is included in page to user device, where user device can send PRTI via RACH AB as a paging response without establishing a TBF).

BSS sends Request for measurement report from user device via EC-PACCH (extended coverage packet associated control channel) message (226). Extended coverage (EC) allows data or calls to be transmitted even in conditions of high penetration loss. In cases of signal penetration loss (e.g., lower signal quality or strength), the user device may send multiple repetitions of access burst or uplink signal with PRTI to neighbor BSs (number of repetitions depends on signal conditions, e.g., RSSI, SINR), and these multiple repetitions allow the BS/BTS receiver to combine these signals to increase likelihood of signal decoding.

User device measures the possible neighbour-cells/neighbor BSs (e.g., user device receives synchronization signals, determines BS identity code (BSIC), measures received signal power and/or signal quality (e.g., RSSI, SINR, RSRP).

User device reports, e.g., via measurement report (228) the BSIC and RX level (signal receive/power level for signal received from neighbor BS) value per neighbour cell via another EC-RACH attempt followed by TBF. (228). In addition, the user device may measure the observed time difference for each neighbor BS (or at least one or more neighbor BSs) with respect to serving BS, and may include in the measurement report the OTD for each neighbor BS or each of a subset of the neighbor BSs for which a RX (receive) level is reported.

BSS forwards the measurement report to SMLC plus the serving cell/serving BS identity with the latest TA information. (230)

SMLC provides 2 or more neighbour base station identities for which timing advance information is needed for position estimation (232).

BSS assigns PRTI for the current TA measurement procedure and uses this as reference for TA collection from these selected neighbour cells/BSs instead of TLLI (234).

BSS sends in the cell reselection list the selected base station identifiers from measurement report along with the PRTI (236). In an example implementation, the user device acknowledges receipt of the cell reselection list to its serving BS by sending just one access burst (instead of a PDAN (packet DL acknowledgement/negative acknowledgement message)) in one of the four TDMA frames of a (EC-) PACCH, where the TDMA frame chosen ($1^{st}$, $2^{nd}$, $3^{rd}$ or $4^{th}$ out of the four) depends on whether the cell reselection list was successfully received. For example, if the network's message includes of up to 2 RLC/MAC blocks, transmitting the access burst in the 1st TDMA frame of the (EC-)PACCH block may indicate a negative acknowledgement for all RLC/MAC blocks of that message, transmitting the access burst in the 2nd TDMA frame of the (EC-) PACCH block may indicate a positive acknowledgement for all RLC/MAC blocks of that message, transmitting the access burst in the 3rd TDMA frame of the (EC-)PACCH block may indicate a negative acknowledgement for the first and a positive acknowledgement for the 2nd RLC/MAC block, and transmitting the access burst in the 4th TDMA frame of the (EC-)PACCH block may indicate a positive acknowledgement for the first and a negative acknowledgement for the 2nd RLC/MAC block.

User device only sends (EC-)RACH with the uplink signal (e.g., which may be an Access Burst (AB)) carrying the received PRTI to the first BS contained in the cell reselection list. The first BS sends acknowledgment including the PRTI via common control channel such as EC-AGCH (extended coverage access grant channel) without TBF establishment. On reception of the acknowledgement, user device (MS) switches to the second BS contained in the cell reselection list and continues in the same way for any other BSs in cell reselection list. (238)

User device (MS) completes the procedure on receiving the acknowledgement from the last BS contained in the cell reselection list in response to its transmission of uplink signals (e.g., access burst containing PRTI) on the (EC-) RACH.

Method-1—Extension: TA Collection Using EC-RACH without TBF Establishment with Extended EC-RACH If the PRTI of 10 bits is not sufficient to handle a high number of parallel procedures beyond 1024, the bit size of PRTI may be extended to a higher value. In this case the uplink signal (e.g., which may be an access burst sent via EC-RACH) needs to carry more than 11 bits. In an example implementation, the PRTI cannot make use of all 11 bits that the EC-RACH access burst can carry because one bit may be used as a flag to indicate whether the access burst carries a PRTI.

A segmented PRTI transmission (e.g., multiple uplink signals or access burst signals over EC-RACH) over 2 timeslots (TSs) (such as using consecutive timeslots TS0 and TS1) can be used in this case, for example. If extended PRTI is used, then the user device transmits two uplink signals (e.g., access bursts) in successive time-slots each carrying one part of PRTI. The uplink signal (e.g., access burst) on TS0 carries the first (e.g., upper) part of the PRTI and the uplink signal or access burst on TS1 carries the second (e.g., lower) part of the PRTI. The neighbor BS that receives the uplink signals or access bursts uses both access bursts for timing advance estimation and combines the payloads (the two PRTI parts) received from both bursts to obtain the extended PRTI value, for example. According to an example implementation, if same PRTI is assigned for more than one MS/user device identifiers (e.g., TMSI/IMSI), the BS may allocate another single dedicated burst where user device sends another identifier to identify the multiple user devices sharing the same PRTI.

Method 2: Dedicated Access Burst Transmission Over EC-PACCH/T on BCCH Carrier

The uplink signal (e.g., access burst) transmitted for TA estimation in above depicted methods may use, for example, a common control channel. Hence, when using a common control channel to transmit the uplink signal or access burst, there could be a considerable delay due to collisions with other uplink signals or access bursts transmitted via EC-RACH within the same cell. If faster timing advance collection is required, the uplink signals or access bursts can be sent over a dedicated resource using PDCH's (packet data channels) where EC-PDTCH (enhanced coverage packet data traffic channels) or EC-PACCH (enhanced coverage packet associated control channel) channels are served in the selected neighbour cells.

The modified procedure as per this concept is explained below. The paging and measurement report collection sub-procedures may be the same as those depicted for method 1. Hence, the BSS obtains the measurement report from the user device and indicates the same to SMLC as per earlier methods.

SMLC provides 2 or more selected base stations to BSS from which timing advance information is needed for the position estimation.

BSS (BSC) defines the resource in terms of TDMA frames for reception of dedicated access bursts at each of the selected neighbour base stations based on different starting TDMA frame number (START-FN) and in terms of allocate timeslot on the BCCH (broadcast control channel) carrier.

BSS (BSC) informs each of the selected neighbour base stations about the PRTI value expected in those reserved resources.

Each BS reserves the corresponding one or more uplink TDMA frames for the EC-PACCH/T uplink signal (e.g., access burst) transmission at and, in the case of more than one UL (uplink) TDMA frame, also after the given starting TDMA frame number (START-FN) and allocated timeslot.

EC-PACCH/T only uses single timeslot for all coverage classes. For higher coverage classes the number of blind physical layer transmissions may remain the same as for the EC-RACH case:

Coverage Class CC1 requires only single burst within a radio block for this purpose.

Coverage Class CC2 blindly transmits the AB (access burst) in 4 bursts of the radio block.

Coverage Class CC3 blindly repeats the EC-PACCH/T radio block in 4 consecutive radio blocks (16 bursts).

Coverage Class CC4 blindly repeats the EC-PACCH/T radio block in 12 consecutive radio blocks (48 bursts).

The appropriate number of blind physical layer transmissions above may be aligned to use blind physical layer transmissions used on EC-RACH and can be adapted based on link level simulation results for all coverage classes.

BSS sends new message, e.g. on EC-PACCH, to user device which instructs the user device to send the access burst on specific TDMA frames in each of the selected neighbour cells/BSs along with the coverage class related information to enable the user device to determine the number of repetitions (of the uplink signal or access burst) on uplink. The message hence contains a predefined schedule for accessing these selected neighbour cells. If the user device cannot send the access burst on the specific TDMA frame (e.g., dedicated resource) due to delay in synchronizing to neighbor BS, the user device may send the access burst on the common control channel (e.g., on the random access channel/RACH).

Each BS detects uplink signal, e.g., sent via EC-PACCH/T on specific dedicated resources, such as on specific time-slots in specific TDMA frames, decodes the received information and upon decoding success, forwards the PRTI (or another identifier for the user device) and the calculated timing advance (TA) measurement, e.g., obtained by processing one or a sequence of access bursts using averaging, to the BSS (BSC).

BSS (BSC) collects all the TA measurements from the selected BSs (and the serving BS if not done before) and forwards them to the SMLC.

Alternatively serving BS can allocate the dedicated access burst for first BS only, and on reception of dedicated uplink signal or access burst from first BS, BSS can allocate the dedicated resources for uplink signal (or access burst) transmission in next BS until access attempt in all neighbor BSs are completed. By way of non-limiting example, this method may be used, for example, if one-time allocation with large difference in START-FN across all (or multiple) BSs is not possible at the same time.

According to an example implementation, BSS, as part of allocating dedicated resources in selected BSs, informs the expected PRTI on the dedicated resource. When the BS receives the access burst/uplink signal on the dedicated resource, it uses the synchronization sequence and also the known PRTI value together for TA estimation which will improve the estimation as compared to using the synchronization sequence alone.

Figure 3:
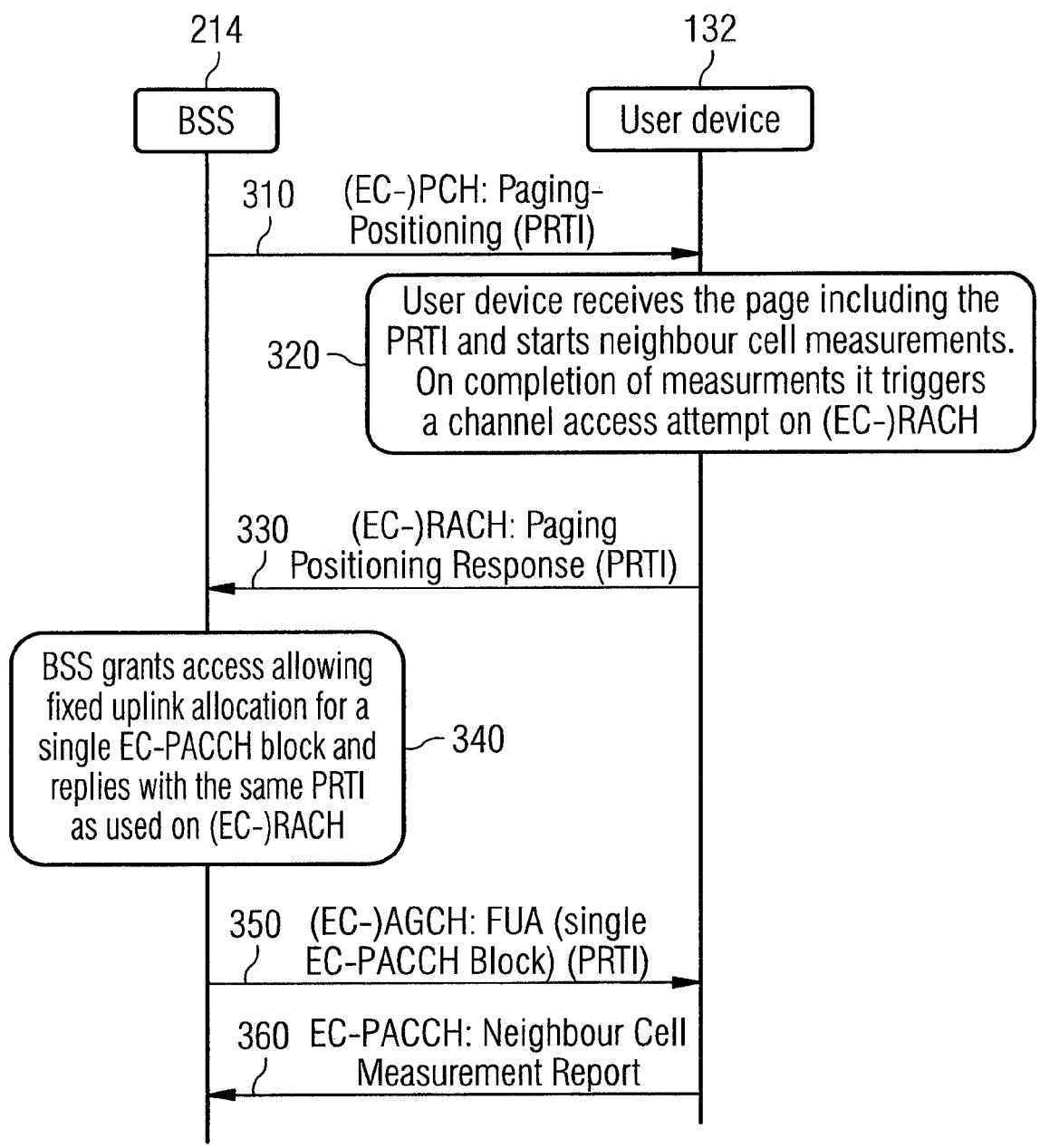
FIG. 3 is a diagram illustrating operation of a system according to another example implementation.

FIG. 3 is a diagram illustrating operation of a system according to another example implementation. In this illustrative example, further energy savings may be provided for a user device because the PRTI is included in a page request sent to the user device, where the user device sends PRTI via uplink signal (e.g., access burst sent via random access channel (RACH)) in a paging response without establishing a TBF. Thus, by including the PRTI in the paging response, the user device may save additional energy since a TBF is not required for acknowledging that the user device received the page request with the PRTI. According to an example implementation, the serving BS will, after receiving the page response with the PRTI, e.g. on the (EC-)AGCH, request the user device to provide a measurement report. According to another example implementation, the page request with the PRTI will imply a request to provide a measurement report. According to yet another example implementation, the user device will, after having received the page request with the PRTI, perform the measurement and only afterwards send the paging response with the PRTI to the serving BS.

At 310, a page request (paging-positioning request), including the PRTI is sent by BSS 214 to user device 132. At 320, the user device receives the page request (paging positioning request) including the PRTI and then user device performs neighbor cell/BS measurements (to measure signal strength or receive power, and OTD, for each of a plurality of neighbor BSs/cells).

At 330, upon completion of its neighbor measurements, the user device then sends a paging response (e.g., paging positioning response) to serving BS/BSS 214 via access burst or uplink signal via common control channel (RACH/ random access channel), where the paging response includes the PRTI. Thus, in this manner, by receiving the PRTI in the page/page request, the paging response may be sent by user device to serving BS/BSS 214 with the PRTI (since the PRTI is short enough to fit within uplink signal or access burst), while avoiding establishing a TBF (at least for the contention resolution because a TBF is not necessary to identify the user device that has sent the uplink signal or access burst via random access channel/RACH).

At 340, the BSS grants access by allowing or allocating to the user device a fixed uplink allocation (FUA) for a single block, and then, at 350, the BSS sends a FUA via access grant channel, including the PRTI and indication of the allocated resource block. At 360, the user device sends the neighbor cell measurement report to the serving BS/BSS 214.

Method 3: Enhancements for Paging-Positioning-Response for Positioning Measurements According to an example implementation, a first step of positioning measurements for TA multilateration for an idle mode user device starts with paging the user device/MS. The user device may then send an uplink signal or access burst via random access channel (EC-RACH) followed by TBF for single block to send the P-TMSI so that the page is bound to the page-response first, before proceeding with measurement report collection from user device. According to an example implementation, this procedure can be improved with the inclusion of the PRTI in the page message, as shown in FIG. 3, for example.

The modified procedure for paging and measurement report collection as per this method involves the following steps.

1. BSS sends EC-Paging-Positioning containing P-TMSI and PRTI.
2. User device on reception of this message, sends (EC-) RACH access burst(s) which carries/carry only the PRTI.
3. BSS on reception of the PRTI sends EC-AGCH message requesting the MS to send the measurement report.

Method 4: Multilateration Based on MS Measurement of Observed Time Difference with Reference to Serving Cell Instead of using the timing of access burst at BS to estimate the distance of user device from base station, the distance between user device and BS may also be derived based on user device reported observed time difference (OTD) between neighbour cells from different sites and reference-cell (serving-cell) and the timing advance with the serving-cell. This mechanism requires that the network should be aware of the real time difference of the respective neighbour cell base stations and serving base stations or all the base stations are time synchronised to a common reference.

In case of asynchronous BS deployments, the network can estimate the real time difference between base stations based on OTD measurement and TA estimation on these cells. Fewer TA measurements with neighbour cells will be needed if, in the same geographical area, the position of more than one user device is measured within a short period of time. For two user devices, the procedure involves two phases— the first phase uses the first user device whose position is determined to determine also the real time differences between the base stations involved in the positioning, and in the second phase, the second user device benefits from the information gathered in the first phase.

Phase 1: BSS estimation of real time difference between serving-cell and its neighbour cells based on user device timing advance (e.g. by Access bursts) and OTD measurements.

Phase 2: Position estimation based on OTD measurements and real time difference information maintained in the network.

If there are more than two mobile stations/user devices whose position needs to be measured more or less simultaneously in the same geographical area (e.g. when the neighbour cell measurement report from a first user device arrives, neighbour cell measurement reports have already been requested from two other user devices), a joint estimation can be tried, and if it succeeds, the position of all involved mobile stations can be determined without further TA measurements.

When positioning measurement is requested for user device, BSS triggers measurement report from user device to report RX level measurements (e.g. based on total power on the channel or only the wanted signal's power) and observed time differences of neighbour cells. Because of limited size of the measurement report, the user device may have to select the base stations/cells for which it reports observed time differences. Some cells may be rather unsuitable for a multilateration already due to the sectorization, e.g. cells pointing into the wrong direction or neighbour cells at the same site as the serving cell. Since a multilateration requires the involved base stations to be at different sites, reporting an observed time difference for one of a group of co-located base stations/cells is enough. In many cases, co-located base stations/cells are time-synchronized, even in unsynchronized networks. A user device may exploit this property by reporting for a set of base stations/cells with the same or virtually the same observed time difference to the serving base station only the observed time difference of the strongest base station/cell and by not reporting observed time difference values for base stations/cells with (virtually) the same timing as the serving base station. Furthermore, the user device should not report unreliable time difference observations because the positioning is very sensitive to errors.

The network may assist the selection, e.g., by providing information about base stations/cells for which observed time differences should not be reported or only with low priority and/or information about base stations/cells for which observed time differences should be reported if the user device can receive them. The network can provide such information e.g. on a broadcast channel or in a message to the user device when it requests it to provide a measurement report. In another example, the network provides information about which of the base stations/cells form groups of co-located base stations/cells. (For identifying base stations, the network may refer to a list of neighbour cells that it anyway broadcasts for the purpose of cell reselection or handover.) The user device will give lower priority for reporting observed time differences to base stations/cells for which, from the same site, another base station/cell is received with higher level. (An alternative criterion to the received signal strength is, for example, the signal-to-interference-plus-noise ratio).

The network may signal a number of base stations/cells for which the user device shall report observed time differences. If the number of detected base stations/cells that fulfil the criteria for reporting the observed time difference is lower than or equal to the commanded number, the user device provides reports for these detected base stations/cells. If the number of detected base stations/cells that fulfil the criteria for reporting the observed time difference is greater than the requested number, the user device provides reports for these detected base stations/cells with a priority for the base stations/cells with the highest Rx level. The user device may report observed time differences for more base stations/cells than commanded if the reports for the additional base stations/cells fit into the report message.

For reporting the observed time differences, the user device may reduce the number of required bits by a modulo operation.

The user device may also select the base stations/cells for which it reports a received signal strength according to one or more of these criteria.

The user device may also include information about its battery state into the report. For example, '0' means that energy consumption for positioning is not an issue, and '1' means that a balanced trade-off between positioning accuracy and energy consumption is desired. '1' could be chosen e.g. by terminals whose battery is not rechargeable and by terminals whose battery state is low. If '1' is chosen, the network may estimate the distances to other base stations based on OTD measurements with those other base stations which are, from the user device's perspective, in extended coverage, provided that a corresponding and still sufficiently accurate real time difference value is available in the network. For the remaining base stations needed for the multilateration, the distances are derived from TA measurements with those base stations.

Measurement report and the TA in the serving cell are assessed by the network.

If sufficiently up-to-date real time difference values between the involved cells are available for calculating the user device's position with sufficient accuracy or if there are recent positioning related reports from other user devices involving the same set of cells that can be used for a joint position estimation of all user devices, the user device's position is calculated. If the network can improve its estimate of the real time differences based on the user device's report, it will do so for use in potential positioning tasks in the near future.

Otherwise, the network triggers one or more TA measurements with neighbour cell sites. Based on these TA values, the TA in the serving cell and the observed time difference reported in phase 1, the network calculates the real time differences and stores them for a predefined period of time for future positioning tasks. It also calculates the user device's position. In the case of an ambiguity, the pattern of the neighbour cells' Rx levels can be used to resolve it.

In the above method the information on real-time difference across cells can be maintained in BSS, SMLC or another entity. In this case, this new entity needs to be updated when the network receives OTD measurements and also when TA estimation is completed.

Figure 4:
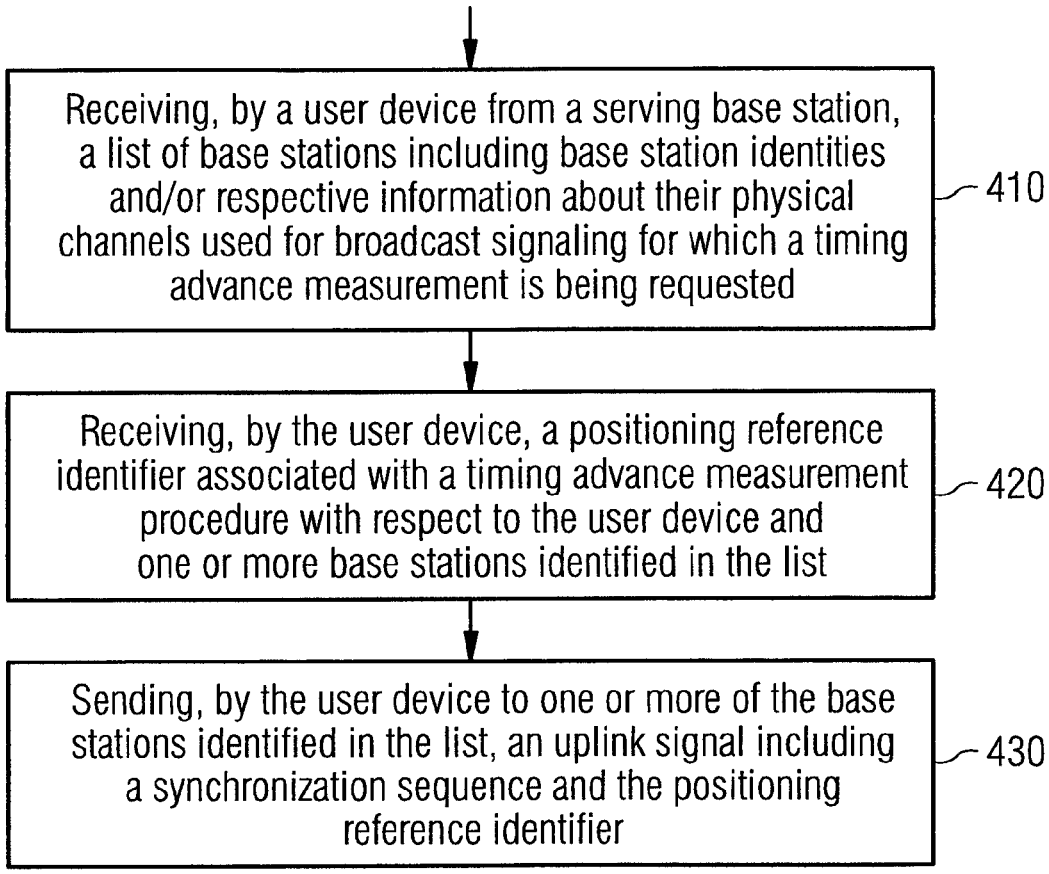
FIG. 4 is a flow chart illustrating operation of a user device according to an example implementation.

FIG. 4 is a flow chart illustrating operation of a user device according to an example implementation. Operation 410 includes receiving, by a user device from a serving base station, a list of base stations including base station identities and/or respective information about their physical channels used for broadcast signaling for which a timing advance measurement is being requested. Operation 420 includes receiving, by the user device, a positioning reference identifier associated with a timing advance measurement procedure with respect to the user device and one or more base stations identified in the list. And, operation 430 includes sending, by the user device to one or more of the base stations identified in the list, an uplink signal including a synchronization sequence and the positioning reference identifier.

According to an example implementation of the method of FIG. 4, the receiving a list of base station identities and receiving a positioning reference identifier may include: receiving a cell reselection command that includes: 1) the positioning reference identifier associated with a timing advance measurement procedure with respect to the user device and one or more base stations, and 2) the list that identifies one or more of the base stations for which a timing advance measurement is being requested.

According to an example implementation of the method of FIG. 4, the sending may include sending, by the user device to one or more of the base stations identified in the list, the uplink signal that includes the synchronization sequence and the positioning reference identifier to cause each of the one or more base stations identified in the list to measure a timing advance with respect to the user device and report the timing advance to a network entity.

According to an example implementation of the method of FIG. 4, the sending may include sending, by the user device, via a random access channel, to one or more of the base stations identified in the list, the uplink signal that includes the synchronization sequence and the positioning reference identifier.

According to an example implementation of the method of FIG. 4, the method may further include receiving, by the user device from one or more of the base stations identified in the list via an access grant channel, a message that includes the positioning reference identifier to acknowledge to the user device that the base station received, from the user device, the uplink signal that included the synchronization sequence and the positioning reference identifier.

According to an example implementation of the method of FIG. 4, the method may further include receiving, by the user device from the serving base station, information identifying a dedicated resource for transmitting (sending), one or more times as indicated by the serving base station, the uplink signal to a first base station of the base stations identified in the list; wherein the sending includes: sending, by the user device one or more times as indicated by the serving base station, via the dedicated resource, to the first base station, the uplink signal that includes the synchronization sequence and the positioning reference identifier; and sending, by the user device if the user device cannot send the uplink signal via the dedicated resource for any reason, the uplink signal via a random access channel.

According to an example implementation of the method of FIG. 4, the method may further include receiving, by the user device from the first base station via another dedicated resource, a message that includes the positioning reference identifier to acknowledge to the user device that the first base station received, from the user device, the uplink signal that included the synchronization sequence and the positioning reference identifier.

According to an example implementation of the method of FIG. 4, the sending may include sending, by the user device to one or more of the base stations identified in the list, the uplink signal that includes the synchronization sequence, the positioning reference identifier and a flag or bit that indicates a presence of the positioning reference identifier in the uplink signal.

According to an example implementation of the method of FIG. 4, the sending may include sending, by the user device to a first base station of the one or more base stations identified in the list, a first uplink signal that includes the synchronization sequence and a first part of the positioning reference identifier; and sending, by the user device to the first base station of the one or more base stations identified in the list, a second or further uplink signal that includes the synchronization sequence and a second or further part of the positioning reference identifier. In an example implementation, the first uplink signal is transmitted via a first time slot, and the second uplink signal is transmitted via a second time slot that is adjacent to the first time slot.

According to an example implementation of the method of FIG. 4, the receiving a positioning reference identifier may include receiving, by the user device within a paging request from the serving base station, a positioning reference identifier associated with a timing advance measurement procedure with respect to the user device and one or more base stations identified in the list.

According to an example implementation of the method of FIG. 4, the method may further include: measuring, by the user device for one or more non-serving base stations, an observed time difference of signals received from the one or more non-serving base stations with respect to same or corresponding signals received from the serving base station; receiving, by the user device from the serving base station, information about the inclusion and/or exclusion of at least one non-serving base stations on the list into/from a reporting of observed time differences; selecting by the user device, according to the information received from the serving base station, a subset of the one or more non-serving base stations; and, sending, by the user device to the serving base station, a measurement report that includes one or more observed time differences, including a measure time difference measured for each of the selected base stations.

According to an example implementation of the method of FIG. 4, the method may further include measuring, by the user device for one or more non-serving base stations, an observed time difference of signals received from the non-serving base station with respect to same or corresponding signals received from the serving base station; receiving, by the user device from the serving base station, a list of groups of base stations that are co-located or located at the same physical site; selecting, by the user device based on the list of groups of base stations that are co-located, one or more of the base stations that are not co-located, to report the observed time difference; and sending, by the user device to the serving base station, a measurement report that includes at least an observed time difference measured for each of the selected base stations that are not co-located.

According to an example implementation, an apparatus may include means (e.g., 702A or 702B and/or 704, FIG. 7) for receiving, by a user device from a serving base station, a list of base stations including base station identities and/or respective information about their physical channels used for broadcast signaling for which a timing advance measurement is being requested, means (e.g., 702A or 702B and/or 704, FIG. 7) for receiving, by the user device, a positioning reference identifier associated with a timing advance measurement procedure with respect to the user device and one or more base stations identified in the list, and means (e.g., 702A or 702B and/or 704, FIG. 7) for sending, by the user device to one or more of the base stations identified in the list, an uplink signal including a synchronization sequence and the positioning reference identifier.

According to an example implementation of the apparatus, the means for receiving a list of base station identities and receiving a positioning reference identifier may include: means (e.g., 702A or 702B and/or 704, FIG. 7) for receiving a cell reselection command that includes: 1) the positioning reference identifier associated with a timing advance measurement procedure with respect to the user device and one or more base stations, and 2) the list that identifies one or more of the base stations for which a timing advance measurement is being requested.

According to an example implementation of the apparatus, the means for sending may include means (e.g., 702A or 702B and/or 704, FIG. 7) for sending, by the user device to one or more of the base stations identified in the list, the uplink signal that includes the synchronization sequence and the positioning reference identifier to cause each of the one or more base stations identified in the list to measure a timing advance with respect to the user device and report the timing advance to a network entity.

According to an example implementation of the apparatus, the means for sending may include means (e.g., 702A or 702B and/or 704, FIG. 7) for sending, by the user device, via a random access channel, to one or more of the base stations identified in the list, the uplink signal that includes the synchronization sequence and the positioning reference identifier.

According to an example implementation of the apparatus, the apparatus may further include means (e.g., 702A or 702B and/or 704, FIG. 7) for receiving, by the user device from one or more of the base stations identified in the list via an access grant channel, a message that includes the positioning reference identifier to acknowledge to the user device that the base station received, from the user device, the uplink signal that included the synchronization sequence and the positioning reference identifier.

According to an example implementation of the apparatus, the apparatus may further include means (e.g., 702A or 702B and/or 704, FIG. 7) for receiving, by the user device from the serving base station, information identifying a dedicated resource for transmitting, one or more times as indicated by the serving base station, the uplink signal to a first base station of the base stations identified in the list; wherein the means for sending includes: means (e.g., 702A or 702B and/or 704, FIG. 7) for transmitting, by the user device one or more times as indicated by the serving base station, via the dedicated resource, to the first base station, the uplink signal that includes the synchronization sequence and the positioning reference identifier; and means (e.g., 702A or 702B and/or 704, FIG. 7) for sending, by the user device if the user device cannot send the uplink signal via the dedicated resource for any reason, the uplink signal via a random access channel.

According to an example implementation of the apparatus, the apparatus may further include means (e.g., 702A or 702B and/or 704, FIG. 7) for receiving, by the user device from the first base station via another dedicated resource, a message that includes the positioning reference identifier to acknowledge to the user device that the first base station received, from the user device, the uplink signal that included the synchronization sequence and the positioning reference identifier.

According to an example implementation of the apparatus, the means for sending may include means (e.g., 702A or 702B and/or 704, FIG. 7) for sending, by the user device to one or more of the base stations identified in the list, the uplink signal that includes the synchronization sequence, the positioning reference identifier and a flag or bit that indicates a presence of the positioning reference identifier in the uplink signal.

According to an example implementation of the apparatus, the means for sending may include sending, by the user device to a first base station of the one or more base stations identified in the list, a first uplink signal that includes the synchronization sequence and a first part of the positioning reference identifier; and means (e.g., 702A or 702B and/or 704, FIG. 7) for sending, by the user device to the first base station of the one or more base stations identified in the list, a second or further uplink signal that includes the synchronization sequence and a second or further part of the positioning reference identifier. In an example implementation, the first uplink signal is transmitted via a first time slot, and the second uplink signal is transmitted via a second time slot that is adjacent to the first time slot.

According to an example implementation of the apparatus, the means for receiving a positioning reference identifier may include means (e.g., 702A or 702B and/or 704, FIG. 7) for receiving, by the user device within a paging request from the serving base station, a positioning reference identifier associated with a timing advance measurement procedure with respect to the user device and one or more base stations identified in the list.

According to an example implementation of the apparatus, the apparatus may further include: means (e.g., 702A or 702B and/or 704, FIG. 7) for measuring, by the user device for one or more non-serving base stations, an observed time difference of signals received from the one or more non-serving base stations with respect to same or corresponding signals received from the serving base station; receiving, by the user device from the serving base station, information about the inclusion and/or exclusion of at least one non-serving base stations into/from a reporting of observed time differences; means (e.g., 702A or 702B and/or 704, FIG. 7) for selecting by the user device, according to the information received from the serving base station, a subset of the one or more non-serving base stations; and, means (e.g., 702A or 702B and/or 704, FIG. 7) for sending, by the user device to the serving base station, a measurement report that includes one or more observed time differences, including a measure time difference measured for each of the selected base stations.

According to an example implementation of the apparatus, the apparatus may further include means (e.g., 702A or 702B and/or 704, FIG. 7) for measuring, by the user device for one or more non-serving base stations, an observed time difference of signals received from the base station with respect to same or corresponding signals received from the serving base station; means (e.g., 702A or 702B and/or 704, FIG. 7) for receiving, by the user device from the serving base station, a list of groups of base stations that are co-located or located at the same physical site; selecting, by the user device based on the list of groups of base stations that are co-located, one or more of the non-serving base stations that are not co-located, to report the observed time difference; and means (e.g., 702A or 702B and/or 704, FIG. 7) for sending, by the user device to the serving base station, a measurement report that includes at least an observed time difference measured for each of the selected base stations that are not co-located.

According to an example implementation, an apparatus may include at least one processor and at least one memory including computer instructions, when executed by the at least one processor, cause the apparatus to: receive, by a user device from a serving base station, a list of base stations including base station identities and/or respective information about their physical channels used for broadcast signaling for which a timing advance measurement is being requested; receive, by the user device, a positioning reference identifier associated with a timing advance measurement procedure with respect to the user device and one or more base stations identified in the list; and send, by the user device to one or more of the base stations identified in the list, an uplink signal including a synchronization sequence and the positioning reference identifier.

Figure 5:
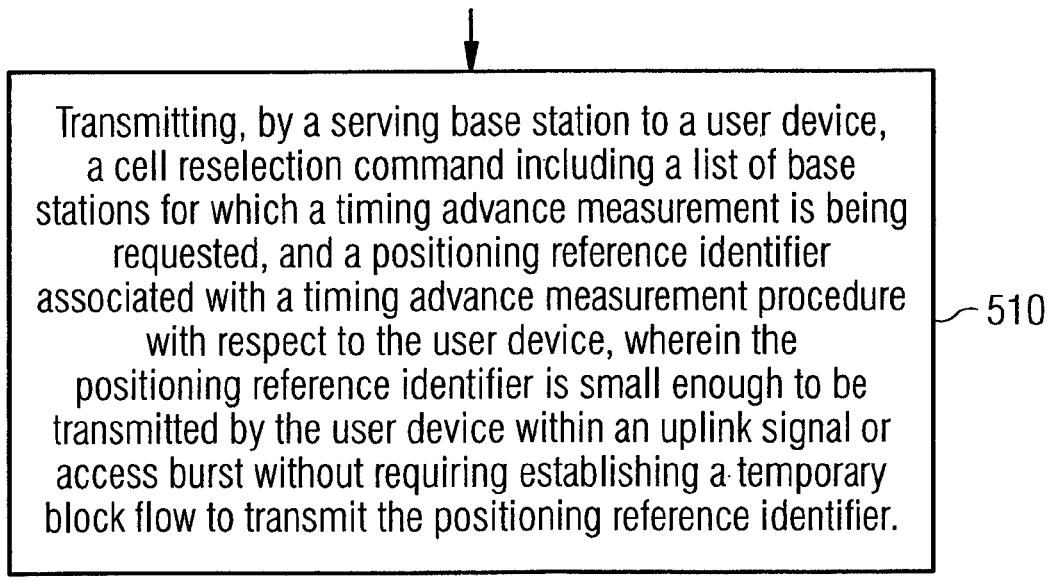
FIG. 5 is a flow chart illustrating operation of a base station according to an example implementation.

FIG. 5 is a flow chart illustrating operation of a base station according to an example implementation. Operation 510 includes transmitting, by a serving base station to a user device, a cell reselection command including a list of base stations for which a timing advance measurement is being requested for the user device, and a positioning reference identifier associated with the timing advance measurement for the user device, wherein the positioning reference identifier is small enough to be transmitted by the user device within an uplink signal or access burst without requiring establishing a temporary block flow to transmit the positioning reference identifier.

According to an example implementation, an apparatus may include means (e.g., 702A or 702B and/or 704, FIG. 7) for transmitting, by a serving base station to a user device, a cell reselection command including a list of base stations for which a timing advance measurement is being requested for the user device, and a positioning reference identifier associated with the timing advance measurement for the user device, wherein the positioning reference identifier is small enough to be transmitted by the user device within an uplink signal or access burst without requiring establishing a temporary block flow to transmit the positioning reference identifier.

Figure 6:
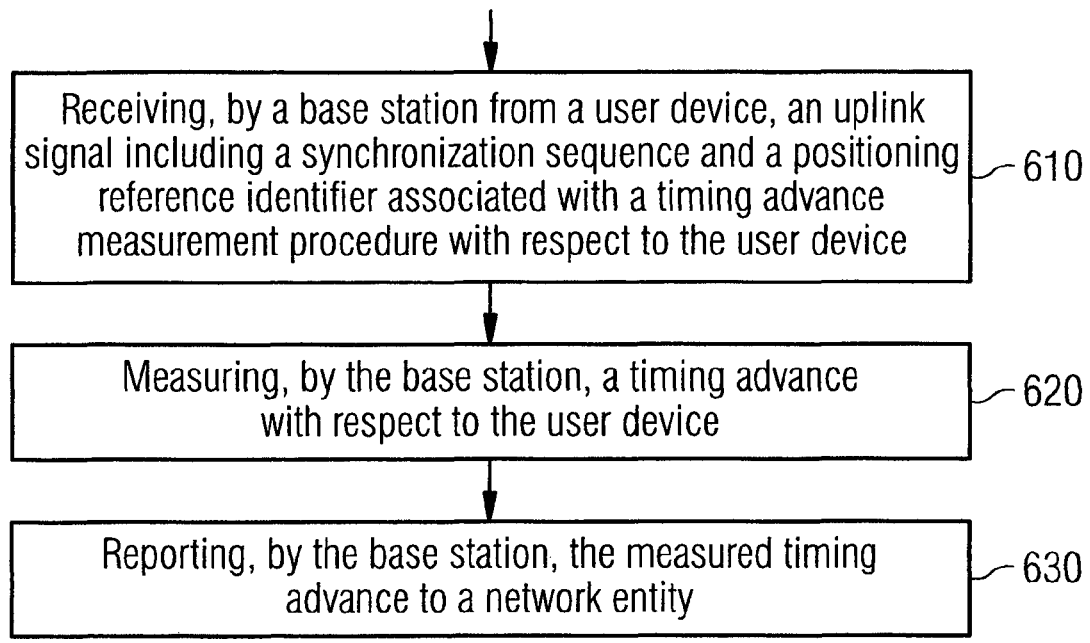
FIG. 6 is a flow chart illustrating operation of a base station according to another example implementation.

FIG. 6 is a flow chart illustrating operation of a base station according to another example implementation. Operation 610 includes receiving, by a base station from a user device, an uplink signal including a synchronization sequence and a positioning reference identifier associated with a timing advance measurement procedure with respect to the user device. Operation 620 includes measuring, by the base station, a timing advance with respect to the user device. And, operation 630 includes reporting, by the base station, the measured timing advance to a network entity.

According to an example implementation of the method of FIG. 6, the receiving may include at least one of the following: receiving, by the base station from the user device, the uplink signal transmitted via an access burst over a random access channel without establishment of a temporary block flow; and receiving, by the base station from the user device, the uplink signal transmitted via an access burst over a dedicated resource without establishment of a temporary block flow.

According to an example implementation of the method of FIG. 6, the method may further include sending, by the base station to the user device, an acknowledgement, including the positioning reference identifier, that acknowledges receipt of the uplink signal.

According to an example implementation of the method of FIG. 6, the received uplink signal may further include a flag that indicates a presence of the positioning reference identifier in the uplink signal.

According to an example implementation, an apparatus includes means (e.g., 702A or 702B and/or 704, FIG. 7) for receiving, by a base station from a user device, an uplink signal including a synchronization sequence and a positioning reference identifier associated with a timing advance measurement procedure with respect to the user device, means (e.g., 702A or 702B and/or 704, FIG. 7) for measuring, by the base station, a timing advance with respect to the user device, means (e.g., 702A or 702B and/or 704, FIG. 7) for reporting, by the base station, the measured timing advance to a network entity.

According to an example implementation, an apparatus includes at least one processor and at least one memory including computer instructions, when executed by the at least one processor, cause the apparatus to: receive, by a base station from a user device, an uplink signal including a synchronization sequence and a positioning reference identifier associated with a timing advance measurement procedure with respect to the user device; measure, by the base station, a timing advance with respect to the user device; and report, by the base station, the measured timing advance to a network entity.

Figure 7:
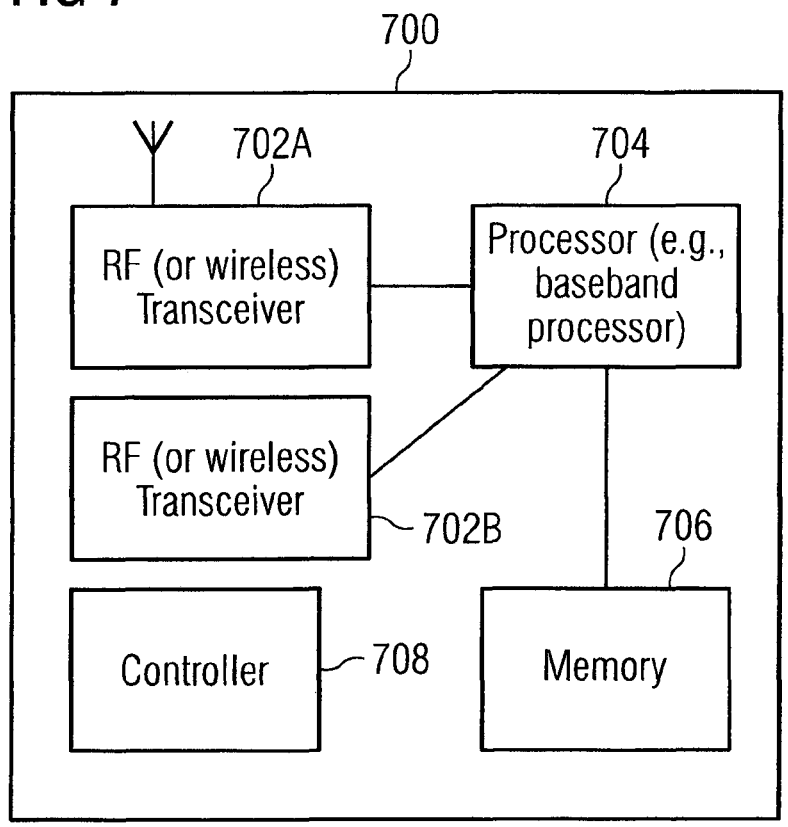
FIG. 7 is a block diagram of a node or wireless station (e.g., base station/access point or mobile station/user device/UE) according to an example implementation.

FIG. 7 is a block diagram of a wireless station (e.g., AP, BS or user device or UE) 700 according to an example implementation. The wireless station 700 may include, for example, one or two RF (radio frequency) or wireless transceivers 702A, 702B, where each wireless transceiver includes a transmitter to transmit signals and a receiver to receive signals. The wireless station also includes a processor or control unit/entity (controller) 704 to execute instructions or software and control transmission and receptions of signals, and a memory 706 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors, microcontrollers, . . . ) embedded in physical objects at different locations. Mobile cyber physical systems, in which the physical system in question has inherent mobility, are a subcategory of cyber-physical systems. Examples of mobile cyber-physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
receiving, by a user device from a serving base station, a list of base stations including base station identities and/or respective information about their physical channels used for broadcast signaling, wherein the user device is a GSM user device, the serving base station is a GSM base station, and the list of base stations is a list of GSM base stations;
receiving, by the user device, a positioning reference identifier associated with a timing advance measurement procedure with respect to the user device and multiple base stations, the multiple base stations being identified in the list of base stations; and
sending, by the user device to the multiple base stations, either:
an access burst including a synchronization sequence and the positioning reference identifier; or
a first access burst including a synchronization sequence and a first part of the positioning reference identifier and a second access burst including a synchronization sequence and a second part of the positioning reference identifier.

2. The method of claim 1 wherein the receiving a list of base station identities and receiving a positioning reference identifier comprises:
receiving a cell reselection command that includes: 1) the positioning reference identifier associated with a timing advance measurement procedure with respect to the user device and a plurality of base stations, and 2) the list that identifies the plurality of base stations.

3. A method of claim 1 wherein the sending comprises:
sending, by the user device to the multiple base stations, the access burst that includes a synchronization sequence and a positioning reference identifier or the first access burst including a synchronization sequence and a first part of the positioning reference identifier and the second access burst including a synchronization sequence and a second part of the positioning reference identifier to cause the multiple base stations to measure a timing advance with respect to the user device and report the timing advance to a network entity.

4. A method of claim 1 wherein the sending comprises:
sending, by the user device, via a random access channel, to the multiple base stations, the access burst that includes a synchronization sequence and a positioning reference identifier or the first access burst including a synchronization sequence and a first part of the positioning reference identifier and the second access burst including a synchronization sequence and a second part of the positioning reference identifier.

5. The method of claim 1 and further comprising:
receiving, by the user device from the multiple base stations via an access grant channel, a message that includes the positioning reference identifier to acknowledge to the user device that the base station received, from the user device, the access burst including a synchronization sequence and a positioning reference identifier or the first access burst including a synchronization sequence and a first part of the positioning reference identifier and the second access burst including a synchronization sequence and a second part of the positioning reference identifier.

6. A method of claim 1 and further comprising:
receiving, by the user device from the serving base station, information identifying a dedicated resource for transmitting, one or more times as indicated by the serving base station, the access burst or the first access burst and the second access burst to a first base station of the base stations identified in the list;
wherein the sending comprises:
sending, by the user device one or more times as indicated by the serving base station, via the dedicated resource, to the first base station, the access burst including a synchronization sequence and a positioning reference identifier or the first access burst including a synchronization sequence and a first part of the positioning reference identifier and the second access burst including a synchronization sequence and a second part of the positioning reference identifier; and
sending, by the user device if the user device cannot perform sending of the access burst or the first access burst and the second access burst via the dedicated resource due to any reason, the access burst or the first access burst and the second access burst via a random access channel.

7. The method of claim 6 and further comprising:
receiving, by the user device from the first base station via another dedicated resource, a message that includes the positioning reference identifier to acknowledge to the user device that the first base station received, from the user device, the access burst including a synchronization sequence and a positioning reference identifier or the first access burst including a synchronization sequence and a first part of the positioning reference identifier and the second access burst including a synchronization sequence and a second part of the positioning reference identifier.

8. The method of claim 1 wherein the sending comprises: sending, by the user device to the multiple base stations, an access burst including a synchronization sequence, a positioning reference identifier and a flag or a bit that indicates a presence of the positioning reference identifier in the access burst.

9. The method of claim 1 wherein the sending comprises: sending, by the user device to a first base station of the multiple base stations, a first access burst including the synchronization sequence and the second part of the positioning reference identifier.

10. The method of claim 9 wherein the first access burst is transmitted via a first time slot, and the second access burst is transmitted via a second time slot that is adjacent to the first time slot.

11. The method of claim 1 wherein the receiving a positioning reference identifier comprises:
receiving, by the user device within a paging request from the serving base station, a positioning reference identifier associated with a timing advance measurement procedure with respect to the user device and a plurality of base stations identified in the list.

12. The method of claim 1 and further comprising:
measuring, by the user device for one or more non-serving base stations, an observed time difference of signals received from the one or more non-serving base stations with respect to same or corresponding signals received from the serving base station;
receiving, by the user device from the serving base station, information about inclusion and/or exclusion of at least one non-serving base station into/from a reporting of observed time differences;
selecting, by the user device, according to the information received from the serving base station, a subset of the one or more non-serving base stations; and
sending, by the user device to the serving base station, a measurement report that includes one or more observed time differences, including a measured time difference for each of the selected base stations.

13. The method of claim 1 and further comprising:
measuring, by the user device for one or more non-serving base stations, an observed time difference of signals received from the base station with respect to same or corresponding signals received from the serving base station;
receiving, by the user device from the serving base station, a list of groups of base stations that are co-located or located at a same physical site;
selecting, by the user device based on the list of groups of base stations that are co-located, one or more of the non-serving base stations that are not co-located, to report the observed time difference; and
sending, by the user device to the serving base station, a measurement report that includes at least an observed time difference measured for each of the selected base stations that are not co-located.

14. An apparatus comprising at least one processor and at least one memory including computer instructions that, when executed by the at least one processor, cause the apparatus to:
receive, by a user device from a serving base station, a list of base stations including base station identities and/or respective information about their physical channels, wherein the user device is a GSM user device, the serving base station is a GSM base station, and the list of base stations is a list of GSM base stations;
receive, by the user device, a positioning reference identifier associated with a timing advance measurement procedure with respect to the user device and multiple base stations, the multiple base stations being identified in the list; and
send, by the user device to the multiple base stations, either:
an access burst including a synchronization sequence and the positioning reference identifier; or
a first access burst including a synchronization sequence and a first part of the positioning reference identifier and a second access burst including a synchronization sequence and a second part of the positioning reference identifier.

15. A method comprising:
transmitting, by a serving base station to a user device, a list of base stations and/or respective information about their physical channels used for broadcast signaling, wherein the user device is a GSM device, the serving base station is a GSM base station, and the list of base stations is a list of GSM base stations; and
transmitting, by the serving base station to the user device, a positioning reference identifier associated with a timing advance measurement procedure with respect to the user device and multiple base stations, the multiple base stations being identified in the list;
wherein the positioning reference identifier is small enough to be transmitted by the user device within one access burst or within two access bursts.

16. A method comprising:
receiving, by a base station from a user device, an access burst, the access burst including including:
a synchronization sequence;
a positioning reference identifier associated with a timing advance measurement procedure with respect to the user device; and
a flag that indicates a presence of the positioning reference identifier in the access burst
measuring, by the base station, a timing advance with respect to the user device; and
reporting, by the base station, the measured timing advance to a network entity.

17. The method of claim 16 wherein the receiving comprises at least one of the following:
receiving, by the base station from the user device, the access burst over a random access channel without establishment of a temporary block flow; or
receiving, by the base station from the user device, the access burst over a dedicated resource without establishment of a temporary block flow.

18. The method of claim 16 and further comprising:
sending, by the base station to the user device, an acknowledgement, including the positioning reference identifier, that acknowledges receipt of:

the access burst; or a first access burst and a second access burst.

19. An apparatus comprising at least one processor and at least one memory including computer instructions, when executed by the at least one processor, cause the apparatus to:
- receive, by a base station from a user device, an access burst, the access burst including:
  - a synchronization sequence;
  - a positioning reference identifier associated with a timing advance measurement procedure with respect to the user device; and
  - a flag that indicates a presence of the positioning reference identifier in the access burst;
- measure, by the base station, a timing advance with respect to the user device; and
- report, by the base station, the measured timing advance to a network entity.

* * * * *